Dec. 18, 1923.
G. W. BOLTON
1,477,864
ARTIFICIAL BAIT
Filed Nov. 29, 1920
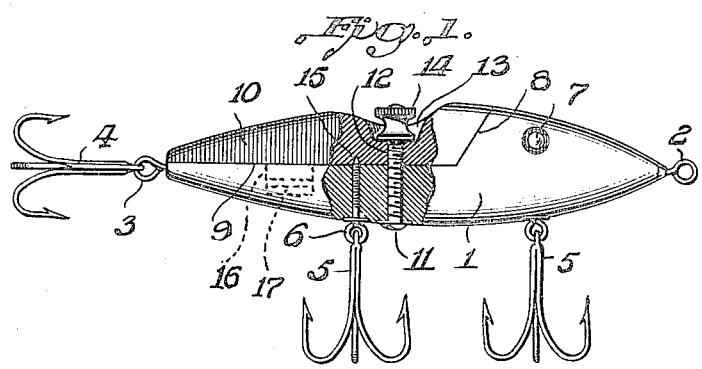
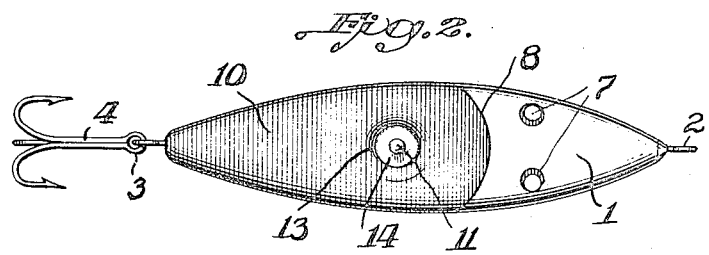
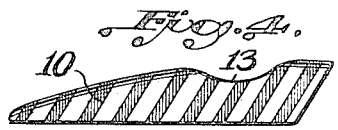
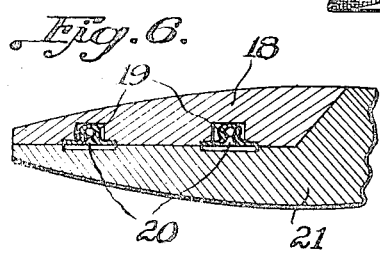
Inventor
George W. Bolton,
By
Attorneys Patented Dec. 18, 1923.

1,477,864

UNITED STATES PATENT OFFICE.

GEORGE W. BOLTON, OF DETROIT, MICHIGAN.

ARTIFICIAL BAIT.

Application filed November 29, 1920. Serial No. 426,962.

*To all whom it may concern:*

Be it known that I, GEORGE W. BOLTON, a citizen of the United States of America, residing at Detroit, in the county of Wayne and State of Michigan, have invented certain new and useful Improvements in Artificial Bait, of which the following is a specification, reference being had therein to the accompanying drawings.

My invention aims to provide an artificial bait or lure having interchangeable members permitting of the appearance of the bait being changed so that it may be used in different localities as a lure for different species of fish.

It is a well known fact that different kinds of water and weather, or bright and cloudy days, often necessitate using different bait on account of visibility, and that a lure which may be attractive to one species of fish is not attractive to another. To meet these different requirements the market is flooded with lures of various kinds in order that a fisherman may satisfy his esthetic taste, and in order for a fisherman to be well equipped for certain waters a great variety of baits must be included in the tackle.

A well known form of bait, to which this invention has special reference, includes a plug having a plurality of gang hooks with the plug finished to represent a minnow, and very often of a shape which will cause the plug to wobble or imitate swimming when drawn through the water. Such a bait to be properly carried in a tackle requires space, therefore a fisherman's outfit is more or less limited to a few of the baits. Furthermore, if these baits are not kept entirely separate they become entangled and it is no easy job to separate them. This requires time and besides it is almost impossible to untangle them without seriously pricking the hands if not imbedding the hooks therein.

My invention aims to provide interchangeable back or belly or head members for a plug bait with each member of a different color or finish from the other members, so that a fisherman may select a member which he believes suitable to the weather, stream and fish and thus fit out the plug bait so that it may be used to entice and possibly catch a certain species of fish. At the will of the fisherman the plug bait can be easily and quickly changed for another species of fish or to try another color, and this is accomplished without the use of tools or much labor, and further with no loss of time in untangling one bait from the other as well as from other articles in the bait box or boat.

The construction entering into my artificial bait will be hereinafter described in connection with the drawing, wherein—

Figure 1 is a side elevation of the artificial bait, partly broken away and partly in section;

Fig. 2 is a plan of the same;

Figs. 3, 4 and 5 are views in side elevation of interchangeable members for the bait, and Fig. 6 is a fragmentary sectional view of a modified form of bait plug.

In the drawing, the reference numeral 1 denotes a bait body or plug which tapers inwardly from its middle portion to its extremities so that the plug will have, more or less, a "minnow" or "torpedo" shape with smooth walls that may be finished to imitate or represent the small fish.

At one end of the head of the plug 1 is an eye or swivel 2 which permits of a line being connected thereto, and at the opposite or tail end of the plug is a connection 3 for a conventional form of gang hook 4.

The bottom or belly of the plug has two or more gang hooks 5 with the connection 6 thereof entering the plug, and the connections of some of the gang hooks may terminate at artificial eyes 7 for the plug.

The top or back of the plug has adjoining seats 8 and 9 for a detachable member 10 and said member has its outer wall flush or substantially so with the walls of the plug 1 so as to be a continuation thereof and present an appearance as though integral with the plug. The seat 9 is flat and extends from the tail of the plug to a point contiguous to the head of the plug where the forward end of the seat meets the seat 8 which is disposed at an obtuse or right angle to the flat seat 9 and constitutes an end wall or abutment for the large end of the member 10. The member 10 is finished with faces corresponding to the seats 8 and 9 so as to have a snug and even fitting with said seats with no part of the member 10 protruding from the walls of the plug. Extending vertically through the middle portion of the plug 1, and screwed into said portion is a screw bolt 11 which is threaded its full length, with its upper end protruding above the seat 9 to extend through an opening 12 in the member 10 and into a recess 13 in the top or back of said member, said recess being of a shape to provide clearance for a knurled nut 14 and fingers employed for screwing or unscrewing the nut on the end of the screw bolt. With the recess 13 providing clearance for the nut 14 said nut is practically countersunk in the wall of the member 10 and presents no obstruction that might interfere with weeds or the striking of the bait by a fish.

It is through the medium of the screw bolt 11 and the nut 14, particularly the latter that the member 10 may be removed or replaced quickly and while the screw bolt and nut will clamp the member 10 on its seats lateral displacement of the member 10 is prevented by the seat 8 and by one of the connections 6 or a special bolt protruding above the seat 9 into a socket or notch 15 provided therefor in the flat face of the member 10. This is best brought out in Fig. 1 where it will be noted that it is practically impossible for the member 10 to become accidentally displaced.

As shown in Fig. 2 the member 10 has the appearance of being integral with the plug and practically the only distinction between the member and plug is that of color, although the member 10 may be the same color as the plug and be lower than the head.

In Figs. 3, 4 and 5, there are members 10 of different colors and either of these members may be easily and quickly mounted on the plug 1 to change the general exterior appearance thereof. It is in this manner that a fisherman may trim or fit out the plug to meet the requirements, as a bait, for a certain species of fish, and with a multiplicity of interchangeable members of different finishes it is possible for a fisherman to convert the plug into a desired bait, at a very small additional cost where otherwise he would have to buy a whole new bait in each instance.

In Fig. 6 of the drawing, I show a detachable member 18 having socket members 19 to receive fastener members 20 of a bait plug 21, the fastener members and socket being constructed somewhat similar to ordinary glove fasteners so that the detachable member 18 may be easily and quickly snapped into engagement with the bait plug. This form of fastener will obviate the necessity of using a screw bolt and nut, particularly the latter, since it is liable to be lost.

Ordinarily the bait plugs 1 and 21 are made of wood and the members 10 and 18 may be made of similar material, but in some instances the members 10 and 18 may be made of celluloid, metal, molded material, or any material which may be readily finished to provide a desired exterior appearance. Then again, instead of making the interchangeable members a part of the top or back of the plug, it is obvious that the plug may be constructed to accommodate a detachable member on its side, head, body or belly, and in order that the bait plugs may be different in weight so as to increase or decrease the buoyancy of the plug I may provide a bait plug with a recess 16 for weights 17, which may be readily placed in the recess 16 when the member 10 is removed therefrom. It is therefore possible to weight a bait plug for deep water fishing or remove the weights so that it may be used for surface fishing.

Again considering the interchangeable members, it will be noted that these members have no hooks to become entangled and pierce the fingers; that a great variety of the interchangeable members may be made of special shapes or colors, to represent bugs, frogs and fish with colors having a luminous effect and shapes producing a wobbling effect as the bait is drawn through the water; and that a fastening means may be employed for attaching the interchangeable members to the bait plug which will not interfere with detachment of the members due to the freezing of water.

From the foregoing it will be observed that I have devised a bait plug, which on account of its simplicity, can be manufactured so cheap that a fisherman may buy several bait plugs at the cost of one of the present ordinary plugs. While in the drawing there are illustrated the preferred embodiments of my invention, it is to be understood that the structural elements may be varied or changed without departing from the scope of the appended claims.

What I claim is:—

1. In an artificial bait casting plug adapted to serve as a lure for species of fish, said plug having permanent hooks and vertical and horizontal seats in its upper rear portion which seats are formed by removing approximately a quarter section of the plug, a plurality of interchangeable members similar to the quarter section of the plug and either of which may be placed in engagement with the plug seats without disturbing the hooks to impart an appearance to the plug more suitable as a bait for one species of fish than another, and quick detachable means adapted to hold either of said members on the seats of said plug so that said members may be hurriedly changed.

2. A bait casting plug as called for in claim 1, wherein said quick detachable means is countersunk in the member attached to the plug and is finger operated.

In testimony whereof I affix my signature in presence of two witnesses.

GEORGE W. BOLTON.

Witnesses:
ANNA M. DORR,
KARL H. BUTLER.